United States Patent [19]
Mecke et al.

[11] 4,296,150
[45] Oct. 20, 1981

[54] TRANSPARENT IMAGE MARKING SHEET FOR PROJECTION SYSTEMS

[75] Inventors: Norbert Mecke; Franz U. Schmitt; Karl-Heinz Schrader; Heinke Blutschkau, all of Hanover, Fed. Rep. of Germany

[73] Assignee: Pelikan A.G., Hanover, Fed. Rep. of Germany

[21] Appl. No.: 136,397

[22] Filed: Apr. 1, 1980

[30] Foreign Application Priority Data
Mar. 26, 1979 [DE] Fed. Rep. of Germany ....... 2911798

[51] Int. Cl.³ .................... B05D 3/10; B05D 5/06; G02B 1/10
[52] U.S. Cl. .................... 427/164; 428/195; 428/199; 428/510; 428/411
[58] Field of Search ............... 427/164; 428/195, 199, 428/474, 510

[56] References Cited
U.S. PATENT DOCUMENTS
3,653,938  4/1972  Obuchi et al. ............. 427/161 X FOREIGN PATENT DOCUMENTS
2751122  5/1978  Fed. Rep. of Germany .

*Primary Examiner*—James R. Hoffman
*Attorney, Agent, or Firm*—Ernest F. Marmorek

[57] ABSTRACT

A transparent image sheet carrier for overhead-projection systems is described based upon a dark-tone colored field with image markings in bright-tone contrasting colors, including a sheet bearing a layer containing at least one acid-resistant dye for imparting the dark-tone color to the field; the dye may be discharged in the locale of the image markings by a discharge device with a simultaneous appearance in the image locale of the bright-tone contrasting color.

12 Claims, No Drawings

4,296,150

TRANSPARENT IMAGE MARKING SHEET FOR PROJECTION SYSTEMS

FIELD OF THE INVENTION

This invention relates to projection systems and more particularly to transparent image sheets for use with overhead projection systems where the images appear brightly colored upon a contrasting dark-tone field and which are insensitive to acids in the environment or occurring upon handling.

BACKGROUND OF THE INVENTION

Image carriers for projection and especially for overhead projection systems are usually clear plastic sheets. The information to be marked or projected is in the form of written or drawn representations applied to the carrier sheet as black or colored images formed by writing or drawing on the carrier sheet.

The overhead projector is normally used under daylight projection conditions, often not in darkened rooms. Therefore, the markings on the sheet must be sharply contrasting as well as legible. Until now, generally black or colored markings to form the images were provided on a white background. However, recently on testing, it was found that legibility could be greatly improved or enhanced when a color contrast was added to the brightness contrast. When the light and dark (black/white) portions of the image or illustration do not have the same color and/or are other than black and white, the distinctiveness and/or recognition factors are enhanced.

Tests have shown that the best legibility and recognition is attained when a bright yellow image or writing appears on a contrasting dark blue background. Until recently such bright images on dark backgrounds could only be satisfactorily produced by using opaque colors or dyes. This, as is well known in the art, is not practical in projections systems where transparency of the field and image colors are required. When opaque colors are used the opaque areas are projected as black areas.

It has been proposed in DOS No. 27 51 122 to produce images on dark-toned backgrounds or fields by means of pH-indicator dyes. If an indicator dye is used, which shifts from blue to yellow based upon the pH applied to the dye (alkaline-blue; acidic-yellow), there may be prepared an overall blue layer of the indicator dye under alkaline conditions which is coated on the carrier sheet and on which image markings may be made by means of an acidic marking device. Such markers are the usual fiber-tipped writing materials which are charged with a liquid acidic medium. Where such an acid has marked the carrier, a bright yellow image is formed on the overall blue field.

Such acid-basic indicator systems, however, have the decisive drawback that they react to trace acids such as are present in the perspiration, particularly from the hands, as well as trace acids present in the polluted atmosphere such as from acidic mists generated in and near power plants where fossil fuels are burned.

Such acid mists are very common in urban environments. Further, the handling of the carriers during projection or during the making of the images, will often cause bright yellow fingerprints to appear on the blue fields in areas of inadvertent contact of the hand with the carrier.

It is also well known that the pH-sensitive dyes are characterized by poor light resistance. By the frequent re-use of the carrier sheets in the projection system, these dyes tend to fade and the overall intensity and contrast between the marked and unmarked areas is reduced. Thus, such pH systems have the drawback of being sensitive to handling, sensitive to the environment, and subject to fading upon extended exposure to light or repeated use.

It is an object of the present invention to provide image carriers for projection systems which overcome the above drawback.

It is another object of the present invention to provide overhead projection sheets on which may be produced brightly colored images or writings on contrastingly colored backgrounds, particularly yellow image writings on blue backgrounds.

It is a further object of the present invention to provide carrier sheets on which the images are light-resistant and insensitive to contamination during handling or from the polluted acidic environment of urban areas.

It is a further object of this invention to provide a carrier sheet having good image contrast and a method for providing such high contrast images on such projection carrier sheets which is based on acid-insensitive dyes.

THE INVENTION

According to the article aspect of the present invention, a transparent image sheet for overhead projection systems is provided based on a dark-tone colored field with image markings in bright-tone contrasting colors comprising a sheet bearing at least one acid-resistant and acid-insensitive dye which imparts the dark-tone color to the sheet, said dye being dischargeable in the locale of said image markings by discharge means, with a simultaneous appearance in said image locale of the bright-tone contrasting color.

According to the process aspect of the present invention, a method is provided of preparing acid-resistant transparent image-bearing sheets for overhead projection systems having bright-colored images upon a contrasting dark-tone colored field which comprises the steps of providing a transparent sheet of dark-tone color field, said color being based upon a dischargeable transparent dye and forming localized images on said field by the application to the image locale of a dye discharge agent to locally discharge said field dye with the simultaneous appearance in said discharged image locale of the bright-colored contrasting image.

The acid-resistant field dyes, according to this invention, may be either redox developable transparent dyes or bisphenol developable dyes. These dyes should develop into transparent dark-tone colors.

Among the redox-developable field dyes preferably of bluish color for this invention are those which may be discharged to the leuco (or substantially colorless) form of the dye by reducing agents such as sulfites or are dyes which are discharged or rendered substantially colorless by oxidizing agents such as hypochlorides. The dye is incorporated into a layer on the carrier substrate sheet. These dyes are discharged by the application of reducing agents.

The bisphenol-developable transparent field dyes for this invention, are those commonly used in color-reaction papers, the so-called "carbonless carbon paper" or NCR papers which have a dark-tone or blue color. For such purposes the color component, such as crystal violet lactone, is developed in color by means of the developing substance, such as bisphenol, into a bluish toned dye. This blue dye is applied as a layer to the carrier sheet. This bisphenol-type of dye in colored form is discharged by application of a polar liquid or mixtures thereof such as glycols or glycerols.

The term dischargeable as used herein is based on the German term "loschen" and refers to the substantial local decolorization of the dark tone colors of the field dye in the desired areas of the image. The term as used implies the clearing, bleaching, obliterating, deleting or canceling the dark tone colors of the dyes in the discharged areas.

The bright-colored, preferably yellow, images are attained in the case of the redox-developable system by the addition of a permanent (non-redox reactive) yellow dye either to the layer containing the dark color reaction system; or by coloring the carrier substrate; or an additional layer on the carrier below the blue dye-containing layer, or by adding a yellow dye to the appropriate redox discharge agent to be locally applied in liquid form. This permanent yellow dye, of course, must be a substantially transparent dye.

In conjunction with the bisphenol-developable systems, a similar transparent yellow dye is used which is not discharged by the discharge agent for the blue dye, and is thus "permanent" to the reaction system for discharging the blue dye. The yellow dye may either be admixed with the blue dye in the blue dye-containing layer, may be applied as a sublayer beneath the blue dye layer coated on the carrier substrate; or into, may be admixed the carrier substrate, or alternatively the bright color may be incorporated into the discharge agent, the polar material used for locally discharging the bisphenol-developed blue dye.

DETAILED DESCRIPTION OF THE INVENTION

Generally, the carrier substrate may be any clear transparent plastic carrier sheet. Suitable sheets include the celluloids (cellulose nitrates), the "safety film" bases such as the cellulose acetates and similar derivatives used in the photographic industry, and various of the polymeric sheets useful and used for projection image carrier sheets for overhead projection.

To these carrier substrates there then may be added the dyes, either redox-developable dyes or the bisphenol-developable dyes. These dyes are preferably added in layer form in suitable binder such as a polyvinyl alcohol or other layer-forming medium which will form a transparent layer upon drying. An emulsion dispersion of the transparent dye may also be used provided that the emulsion dispersion layer upon drying will also form a transparent layer. The preferred binder is polyvinyl alcohol (PVA).

In order to make the PVA layer adhere better to the carrier sheet, there may be applied an intervening adhesive layer of polyvinyl acetate. This intervening adhesion-facilitating layer may also provide a medium for adding and carrying the contrast creating yellow dye as mentioned above.

If it is desired to proceed without the intervening adhesive layer, or if the adhesive layer should not contain the yellow dye, then the contrast-creating yellow dye may be added either to the layer mass used for coating the blue dye on the carrier in the ratio of 1:5 to 1:10 (yellow:blue). The choice of the content ratio of yellow to blue dyes, which may also be larger or smaller than 1:5 to 1:10, depends on the intensity of the dyes used (trinctorial power) and the color which ranges from reddish-yellow to greenish-yellow, as well as on subjective aesthetic points of view.

As reduceable dyes, all dyes may be used that are decolorable or dischargeable by reducing substances, especially those commonly used to produce erasable inks, for instance "ink blue", "astrazon violet", etc.

The choice of the non-reduceable contrast dyes is only limited by their solubility in the application means and their resistance to reduceable substances used for discharging the dark-tone color (blue) dyes.

Sheets prepared from such carriers and containing the dark-toned dyestuffs alone or in combination with yellow dyes or having layers of yellow dye may be locally discharged to form images by writing thereupon with commercially available sulfite-based ink erasers. The ink erasers may be locally applied either by the use of brushes or the reducing discharge agents may be incorporated into felt-tipped marking pens. The erasing substance or discharge agent in the pens may include therein the yellow contrast dye to impart, in the erased regions to those areas where the blue dye has been discharged the contrasting bright yellow-toned color.

Application of the bisphenol developable color reaction systems to the carrier sheets is done by layering on the substrate coating masses of dye and binder, and also solvents for the binder. Upon evaporation of the solvents, the coated layers are complete. An adhesion improving layer is not generally necessary.

The coating masses, in addition to the color reaction system, may also contain the contrasting dye. This latter must be stable against polar solvents. In those cases where no dyed adhesion improving sublayer is used, or where the discharge agent is a polar solvent loaded felt-tipped marker, or a paint is used, the yellow dye may be incorporated therein. In the case of the bisphenol developable dyes, the yellow a contrasting dye, no matter whether incorporated into the coating mass, the adhesive layer or the marking means, must be resistant to the polar solvent discharge agent.

As aforesaid, the permanent bright color contrasting components may be any of the commercially available dyes that are soluble either in the solvents used for the coating masses or which are additionally stable against the discharge agents, either in the redox system or against the polar solvent discharge system. While yellow color has been mentioned, any bright-toned color contrasting to the dark field may be used. Bright orange dyes such as "International Safety Orange" may be used as well as scarlet reds if applied to dark-blue, violet or brown fields.

Generally, it is preferred to apply the blue dye in coating layers on the carrier sheet in a coating mass of preferably between 0.5–6 g per square meter. In such a coating mass the dye should be present in amounts ranging from 0.1 to 3 weight percent of said mass. The thickness of the adhesion layer lies preferably between 0.1 and 0.5 g per square meter.

Correction of the markings produced after they have been made is possible with the redox system as well as with the bisphenol color reaction process. In the redox system, specifically the reduction system, there is used a marking pencil containing a dilute acid, particularly and preferably acetic acid. This offsets the reducing action of the sulfite and reverses it, thus reforming the blue dye from the leuco form. In the case of bisphenol developing system a marking pencil used for redeveloping the discharged dye should contain bisphenol dissolved in a solvent. Corrections prepared by such procedures are hardly detectable.

The invention will be more completely described and preferred modes for the practice thereof are disclosed in the appended examples. The specific components disclosed are commercially available materials. Other art-recognized and functionally equivalent materials are intended. The examples are by no means a source for limiting the scope of the invention which is merely limited by the full extent of the above disclosure and the attached claims.

EXAMPLE 1

| Adhesive layer | |
|---|---|
| ethylacetate | 44.9 weight part |
| ethyl alcohol | 49.9 weight part |
| Mowllith 35/73 | 5.0 weight part/manufactured by Hoechst |
| Neozapon yellow | 0.1 weight part/manufactured by BASF |
| Dye layer | |
| water | 44.0 weight part |
| ethyl alcohol | 44.5 weight part |
| Polyviol W 45/450 | 10.0 weight part manufactured by Wacker |
| Ink Blue | 1.0 weight part |

According to the above there is obtained (after coating for instance on a polyester sheet nylon) an intensely blue overhead sheet, which after marking with a commercially available sulfite-based ink eraser loaded into a felt-tipped marker shows yellow images in the marked area.

EXAMPLE 2

Adhesive layer, as in example 1, but without Neozapon yellow

| Dye layer | |
|---|---|
| water | 44.2 weight part |
| ethyl alcohol | 45.0 weight part |
| Polyviol W 45/450 | 10.0 weight part manufactured by Wacker |
| Green R 27 285 concentrated | 0.2 weight part manufactured by BASF |
| Astrazon Violet F3RL | 0.6 weight part manufactured by Bayer |

This results in a blue-violet sheet which after marking with a sulfite ink eraser-loaded paint brush shows bright light green image mark.

EXAMPLE 3

Adhesive layer, as in example 1, but without Neozapon yellow

| Dye layer | |
|---|---|
| water | 43.9 weight part |
| ethyl alcohol | 44.5 weight part |
| Polyviol W 45/450 | 10.0 weight part manufactured by Wacker |
| Ink Blue | 1.0 weight part |
| Yellow R 33 917 | 0.15 weight part manufactured by BASF |

This provides a blue colored sheet which after marking with a sulfite ink eraser, in a felt-tipped marker has a yellow image in the marked areas.

EXAMPLE 4

| Dye layer | |
|---|---|
| Crystal Violet | 1.0 weight part manuf. by Ciba |
| Lactone | |
| Bisphenol A | 2.0 weight part manuf. by Kepec-Chemie |
| Cellit BL 700 | 10.0 weight part manuf. by Bayer |
| ethyl acetate | 87.0 weight part |
| Neozapon yellow | 0.1 weight part manuf. by BASF |

This example provides a blue carrier sheet which, after marking with a felt-tipped writing instrument containing ethyl glycol and glycerin in the ratio of 1:1, shows bright yellow writing upon a blue field.

We claim:

1. A transparent image sheet carrier for overhead-projection systems based upon a dark-tone colored field with image markings in bright-tone contrasting colors, comprising a sheet bearing a layer containing at least one acid-resistant dye for imparting said dark-tone color to said field, said dye being dischargeable in the locale of said image markings by discharge means with a simultaneous appearance in said image locale of said bright-tone contrasting color.

2. The sheet, according to claim 1, wherein the dye imparting the dark-tone color to said field is a redox dye.

3. The sheet, according to claim 2, wherein the dark-tone dye is reducible to its leuco form by a reducing agent.

4. The sheet, according to claim 3, wherein said reducing agent is a sulfite solution.

5. The sheet, according to claim 1, wherein said bright-tone contrasting color is derived from the light transmitted through said discharged locale by a non-dischargeable bright-tone dye positioned in said locale.

6. The sheet, according to claim 5, wherein said bright-tone is contained in a coating on the carrier sheet alone; or in conjunction with said dark-tone dye; or is contained within the carrier sheet; or within said discharge means for said dark-tone dye.

7. The sheet, according to claim 1, wherein the acid-resistant dye for providing said dark-tone field is a bis-phenol-developable dye which is dischargeable to its substantially colorless leuco form by a polar liquid selected from the group consisting of glycols and glycerols.

8. The sheet, according to claim 7, wherein said polar liquid is selected from the group consisting of glycols, glycerols and mixtures thereof.

9. A method of preparing acid-resistant transparent image bearing sheets for overhead projection systems based upon bright-colored images upon a contrasting dark-tone colored field, which comprises the steps of:

providing a transparent substrate sheet bearing a dark-tone color field layer, said color being based upon a dischargeable transparent dark tone dye, and forming localized images on said field by the application to said image locale of a discharge agent to locally discharge said field dye with the simultaneous appearance in said discharged image locale of the bright-colored contrasting image.

10. A process, according to claim 9, wherein said dark-tone color derives from a dischargeable dye, developable to said dark-tone color by either a redox or a bisphenol dye-forming reaction.

11. A process, according to claim 9, wherein (a) said dye, in the case of the redox reaction is discharged by reduction with a sulfite; or (b) said dye in the case of the bisphenol reaction is discharged by the action of a polar solvent selected from the group consisting of glycols and glycerols.

12. The process, according to claim 9, wherein said bright-colored contrasting image derives from the light transmitted through said discharged locale and through a non-dischargeable bright-tone dye positioned in said locale contained (a) in a separate coating on the carrier sheet, (b) in admixed with said discharged dark-tone dye layer; or (c) is contained within the carrier sheet; or (d) is applied in conjunction with said discharge agent means for said dark-tone dye.

* * * * *